(12) United States Patent
Neft et al.

(10) Patent No.: US 12,103,271 B2
(45) Date of Patent: Oct. 1, 2024

(54) COMPOSITE PANE

(71) Applicant: SAINT-GOBAIN GLASS FRANCE, Courbevoie (FR)

(72) Inventors: Anna Neft, Herzogenrath (DE); Jefferson Do Rosario, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/924,280

(22) PCT Filed: Jun. 15, 2021

(86) PCT No.: PCT/EP2021/066008
§ 371 (c)(1),
(2) Date: Nov. 9, 2022

(87) PCT Pub. No.: WO2021/254976
PCT Pub. Date: Dec. 23, 2021

(65) Prior Publication Data
US 2023/0182444 A1 Jun. 15, 2023

(30) Foreign Application Priority Data
Jun. 16, 2020 (EP) ..................................... 20180151

(51) Int. Cl.
*B32B 15/04* (2006.01)
*B32B 17/06* (2006.01)
*B32B 17/10* (2006.01)

(52) U.S. Cl.
CPC .. *B32B 17/10036* (2013.01); *B32B 17/10229* (2013.01); *B32B 17/10577* (2013.01);
(Continued)

(58) Field of Classification Search
CPC ................................................. B32B 17/10036
(Continued)

(56) References Cited

U.S. PATENT DOCUMENTS 5,914,178 A * 6/1999 Sol ..................... B32B 17/10761
351/44
9,623,634 B2 4/2017 Mannheim Astete et al.
(Continued)

FOREIGN PATENT DOCUMENTS

DE 19927683 C1 1/2001
DE 10 2011 004500 A1 8/2012
(Continued)

OTHER PUBLICATIONS

International Search Report as issued in International Application No. PCT/EP2021/066008, dated Sep. 14, 2021.

*Primary Examiner* — Lauren R Colgan
(74) *Attorney, Agent, or Firm* — Pillsbury Winthrop Shaw Pittman LLP (57) ABSTRACT

A composite pane, includes a laminated stacking sequence composed of an outer pane having an exterior-side surface and an interior-side surface, an inner pane having an exterior-side surface and an interior-side surface, and at least one thermoplastic intermediate layer that joins the interior-side surface of the outer pane to the exterior-side surface of the inner pane, wherein a solar protection coating is applied directly to the interior-side surface of the outer pane, which coating substantially reflects or absorbs rays outside the visible spectrum of solar radiation, in particular infrared rays, a thermal-radiation-reflecting coating is applied directly to the interior-side surface of the inner pane, and the thermoplastic intermediate layer has a printed opaque layer in at least one region.

20 Claims, 5 Drawing Sheets

(52) U.S. Cl.
CPC .. *B32B 17/10651* (2013.01); *B32B 17/10788* (2013.01); *B32B 2255/10* (2013.01); *B32B 2255/205* (2013.01); *B32B 2274/00* (2013.01); *B32B 2307/41* (2013.01)

(58) Field of Classification Search
USPC .................................................. 428/428, 432
See application file for complete search history.

(56) References Cited

U.S. PATENT DOCUMENTS

| | | | | |
|---|---|---|---|---|
| 10,486,395 | B2* | 11/2019 | Labrot | B32B 17/10036 |
| 10,850,477 | B2* | 12/2020 | Schmalbuch | B32B 17/10293 |
| 11,001,037 | B2* | 5/2021 | Hagen | B32B 17/10761 |
| 2006/0081581 | A1* | 4/2006 | Odeh | B32B 17/10761 |
| | | | | 219/203 |
| 2014/0212639 | A1* | 7/2014 | Wery | C09D 11/106 |
| | | | | 524/557 |
| 2014/0362434 | A1* | 12/2014 | Schmitz | B32B 17/10761 |
| | | | | 427/125 |
| 2015/0376935 | A1* | 12/2015 | Greiner | E06B 3/6722 |
| | | | | 65/41 |
| 2016/0096349 | A1* | 4/2016 | Lu | B32B 27/42 |
| | | | | 428/217 |
| 2016/0243796 | A1* | 8/2016 | Mannheim Astete | B32B 17/10651 |
| 2016/0279904 | A1* | 9/2016 | Sienerth | B32B 17/10119 |
| 2017/0136743 | A1* | 5/2017 | Yoshida | B32B 7/022 |
| 2017/0144413 | A1* | 5/2017 | Yamamoto | B32B 27/08 |
| 2017/0232713 | A1* | 8/2017 | Mannheim Astete | B32B 17/10788 |
| | | | | 428/172 |
| 2017/0341491 | A1* | 11/2017 | Nakagawa | C03C 17/04 |
| 2019/0022985 | A1* | 1/2019 | Labrot | B32B 17/10788 |
| 2019/0337269 | A1* | 11/2019 | Sartenaer | E06B 3/66 |
| 2019/0375197 | A1* | 12/2019 | Nakayama | C03C 27/10 |
| 2020/0384739 | A1* | 12/2020 | Hagen | B32B 17/10495 |
| 2020/0391577 | A1* | 12/2020 | Bard | B32B 17/10889 |

FOREIGN PATENT DOCUMENTS

| | | |
|---|---|---|
| WO | WO 2002/018154 A1 | 3/2002 |
| WO | WO 2013/104439 A1 | 7/2013 |
| WO | WO 2013/127563 A1 | 9/2013 |
| WO | WO 2013/131667 A1 | 9/2013 |
| WO | WO 2014/174308 A1 | 10/2014 |
| WO | WO 2018/122770 A1 | 7/2018 |
| WO | WO 2019/038043 A1 | 2/2019 |
| WO | WO 2019/110172 A1 | 6/2019 |

* cited by examiner

COMPOSITE PANE

CROSS-REFERENCE TO RELATED APPLICATIONS

This application is the U.S. National Stage of PCT/EP2021/066008, filed Jun. 15, 2021, which in turn claims priority to European patent application number 20 180 151.1 filed Jun. 16, 2020. The content of these applications are incorporated herein by reference in their entireties.

The invention relates to a composite pane with solar protection coating and thermal-radiation-reflecting coating and a method for its production and its use.

In order to increase the thermal comfort in vehicle cabins, more and more coatings are used on glass panes. DE 19927683 C1 discloses a composite glass pane composed of at least two glass panes and, to join them, a transparent bonding layer in the form of a thermoplastic intermediate layer. The outer pane has a solar protection coating substantially reflecting rays outside the visible spectrum of solar radiation, in particular infrared rays. Furthermore, the composite glass pane is provided, on its surface facing an interior space, with a further transparent coating that is spatially separated from the solar protection coating and that substantially reflects thermal radiation (a so-called low-E layer or low-E coating).

WO2013/127563A1 discloses another composite pane with a solar protection coating between the glass panes and a low-E coating on the interior-side surface. The low-E coating is based on niobium, tantalum, molybdenum, or zirconium.

WO2019/110172A1 discloses another composite pane with a solar protection coating between the glass panes and a low-E coating on the interior-side surface.

In particular, the solar protection coatings are very susceptible to corrosion and usually have to be arranged in the interior of the composite pane, in particular on the interior-side surface II of the outer pane. In order to prevent corrosion starting from the edge of the composite pane, these solar protection coatings are coating-free in the edge region and are hermetically sealed by lamination of the outer pane and the inner pane via a thermoplastic intermediate layer.

From WO 2014/174308 A1, a composite pane is known that has an obscuration band in the form of a masking print. The obscuration band extends in the periphery (i.e., in the perimetral outer edge region) of the pane and is made of a nontransparent (opaque) ceramic ink that is applied on the pane. The masking print obscures in particular the view of any adhesive bead or sections of a frame such as the body of a vehicle when the composite pane is arranged in a vehicle or in a building glazing. Furthermore, the masking print obscures or conceals coating-free sections or coating-free edge regions of coatings and, in particular, the solar protection coating.

The ceramic ink is baked on the surface at relatively high temperatures (usually at 450° C. to 700° C., for example, during the bending of the glass pane) and forms a glass-like coating (or an enamel). However, this form of application of the masking print on a glass pane is difficult or impossible in the case of surface-coated glass. In addition to adhesion problems in the composite pane, undesirable discolorations or defects can develop in the masking print or in the coatings. Furthermore, the production of the composite pane entails increased effort and thus increased costs.

DE 10 2011 004 500 A1 and US 2016/0243796 A1 disclose composite panes, wherein an obscuration area is printed on a plastic layer of the composite pane.

An object of the invention is to specify a composite pane with a solar protection coating, a thermal-radiation-reflecting coating (low-E coating), and an opaque layer that is compatible with the aforementioned coatings or functionalities. A further object of the invention is to specify an economical and variably usable method of production.

This object is accomplished according to the invention by a composite pane according to claim 1. Further embodiments of the composite pane according to the invention are specified by dependent claims.

The composite pane according to the invention comprises a laminated stacking sequence at least composed of
- an outer pane having an exterior-side surface I and an interior-side surface II,
- an inner pane having an exterior-side surface III and an interior-side surface IV, and
- at least one thermoplastic intermediate layer that joins the interior-side surface II of the outer pane to the exterior-side surface III of the inner pane, wherein
- a solar protection coating is applied directly to the interior-side surface II of the outer pane, which coating substantially reflects or absorbs rays outside the visible spectrum of solar radiation, in particular infrared rays,
- a thermal-radiation-reflecting coating (so-called low-E coating) is applied directly to the interior-side surface IV of the inner pane, and
- the thermoplastic intermediate layer has an opaque layer in at least one region and in particular an opaque layer (6) printed on the thermoplastic intermediate layer (3).

The composite pane is intended, in a window opening, to separate an interior, in particular the interior of a vehicle or a building from the external surroundings. The composite pane is a laminate and comprises a first and a second glass pane, referred to in the context of the invention as the "outer pane and inner pane" and joined to one another via a thermoplastic intermediate layer. In the context of the invention, "inner pane" refers to the pane facing the interior in the installed position. "Outer pane" refers to the pane facing the external surroundings in the installed position. In the context of the invention, the "interior-side surface (interior-side surface or inner side or inner surface)" means that surface of the pane that faces the interior in the installed position. In the context of the invention, the "exterior-side surface (or outer side or outer surface)" means that surface of the pane that faces the external surroundings in the installed position.

The surfaces of the glass panes are typically referred to as follows:

The exterior-side surface of the outer pane is referred to as side I. The interior-side surface of the outer pane is referred to as side II. The exterior-side surface of the inner pane is referred to as side III. The interior-side surface of the inner pane is referred to as side IV.

The interior-side surface of the outer pane and the exterior-side surface of the inner pane face one another and are joined to one another by means of the thermoplastic intermediate layer.

According to the invention, the solar protection coating (or solar protection layer, for short) is applied to the interior-side surface II of the outer pane.

The solar protection coating has the function of filtering out components of solar radiation, in particular in the infrared range. The solar protection coating preferably comprises at least one thin transparent metallic layer that is embedded between at least one dielectric layer on each side. Silver has established itself as the preferred metal for the metallic layer since it both has a relatively neutral color effect and selectively reflects the infrared radiation outside the visible range of solar radiation. The dielectric layers have the function of improving the optical properties of the coated pane via their refractive indices and of protecting the metallic functional layer against oxidation. Such solar protection layers, which can, for example, be produced by the reactive sputtering method, are used extensively in glazings for buildings, but also already in motor vehicles. In most cases, layer systems with two silver functional layers but also with three or four silver functional layers are used since their efficiency level, i.e., the reflection of infrared radiation outside the visible range in relation to the transmittance of visible radiation, is greater.

Suitable solar protection coatings are known, for example, from WO2013/104439A1 and from DE 19927683C1.

The dielectric layers are preferably based on dielectric oxides or nitrides, such as ZnO, SnZnO, AlN, $SiO_2$, $TiO_2$, or $Si_3N_4$.

As an alternative to the inorganic, in particular silver-based coatings, the solar protection coating can also be formed on a non-metallic, organic basis. In this case, the solar protection coating is preferably a stack of several, typically several hundred, organic layers with different or alternating refractive indices. The stack is a birefringent dielectric interference stack that reflects IR radiation due to interference effects. Such organic coatings have, compared to metallic coatings, the advantage of higher color neutrality and higher light transmittance. In addition, they do not interfere with the transmission of electromagnetic signals.

In an advantageous embodiment of the invention, the solar protection coating extends over the entire interior-side surface II of the outer pane minus a circumferential frame-shaped coating-free region with a width bS of 1 mm to 50 cm, preferably of 2 mm to 20 cm, and particularly preferably of 1 cm to 20 cm. the coating-free edge region is hermetically sealed by adhesive bonding with the thermoplastic intermediate layer. The solar protection coating is thus advantageously protected against damage and corrosion, emanating in particular from the edge of the composite pane.

According to the invention, a thermal-radiation-reflecting coating is applied to the interior-side surface IV and/or the exterior-side surface III of the inner pane. Such coatings are known, for example, from WO2013/131667A1. The thermal-radiation-reflecting coating can also be referred to as a low emissivity coating, emissivity-reducing coating, low-E coating, or low-E layer. Its function is to reflect thermal radiation, i.e., in particular IR radiation, which has longer wavelengths than the IR component of solar radiation. At low outside temperatures, the low-E coating reflects heat back into the interior and reduces the cooling of the interior. At high outside temperatures, the low-E coating reflects the thermal radiation of the heated composite pane outward and reduces the heating of the interior. On the inner side of the inner pane, the coating according to the invention particularly effectively reduces the emission of thermal radiation of the pane into the interior in the summer and the radiation of heat into the external surroundings in the winter.

The thermal-radiation-reflecting coating preferably comprises a functional layer that contains a transparent conductive oxide (TCO), preferably indium tin oxide, tin oxide doped with antimony or fluorine, and/or zinc oxide doped with gallium and/or aluminum (ZnO: Ga, or ZnO: Al), indium tin oxide being preferred. The functional layer can, however, also contain other electrically conductive oxides, for example, fluorine-doped tin oxide ($SnO_2$:F), antimony-doped tin oxide ($SnO_2$:Sb), mixed indium-zinc oxide (IZO), gallium-doped or aluminum-doped zinc oxide, niobium-doped titanium oxide, cadmium stannate, and/or zinc stannate. Particularly good results in terms of emissivity and bendability of the coating according to the invention are achieved with these. The refractive index of the material of the functional layer is preferably 1.7 to 2.5.

The indium tin oxide is preferably deposited by magnetron-enhanced cathodic sputtering using a target of indium tin oxide. The target preferably contains from 75 wt.-% to 95 wt.-% indium oxide and from 5 wt.-% to 25 wt.-% tin oxide as well as production-related admixtures. The deposition of the tin-doped indium oxide is preferably carried out under a protective gas atmosphere, for example, argon. A small proportion of oxygen can also be added to the protective gas, for example, to improve the homogeneity of the functional layer.

The target can, alternatively, preferably contain at least from 75 wt.-% to 95 wt.-% indium and from 5 wt.-% to 25 wt.-% tin. The deposition of the indium tin oxide is preferably carried out under the addition of oxygen as a reaction gas during the cathodic sputtering.

The thermal-radiation-reflecting coating also typically includes dielectric layers, in particular formed from dielectric oxides or nitrides, such as ZnO, SnZnO, AlN, $TiO_2$, $SiO_2$, or $Si_3N_4$. The layer of reflecting conductive oxide is made anti-reflective by the use of additional dielectric layers above and below in order to ensure sufficiently low reflection from the inner side.

The emissivity of the pane according to the invention can be influenced by the thickness of the functional layer of the thermal-radiation-reflecting coating. The thickness of the functional layer is preferably 40 nm to 200 nm, particularly preferably 60 nm to 150 nm, and most particularly preferably 65 nm to 85 nm, for example, approx. 75 nm. In this range for the thickness, particularly advantageous values for the emissivity and a particularly advantageous capability of the thermal-radiation-reflecting coating to withstand a mechanical transformation, such as bending or tempering, without damage are achieved.

The interior-side emissivity of the composite pane according to the invention is preferably less than or equal to 50%, particularly preferably from 10% to 50%, most particularly preferably from 20% to 35%. "Interior-side emissivity" refers to the measurement that indicates how much thermal radiation the pane in the installed position emits into an interior, for example, of a building or a vehicle, compared to an ideal thermal radiator (a black body). In the context of the invention, "emissivity" means the normal emissivity at 283 K per the EN 12898 standard.

The composite pane according to the invention is further preferably characterized in that the inner pane, together with the thermal-radiation-reflecting coating (low-E layer) applied thereto, has light transmittance from 25% to 95%.

The thermoplastic intermediate layer is formed by one or more thermoplastic polymer films. The thermoplastic films preferably contain polyvinyl butyral (PVB), ethylene vinyl acetate (EVA), polyurethane (PU), and/or mixtures thereof and/or copolymers thereof, particularly preferably polyvinyl butyral. The films are preferably formed on the basis of the materials mentioned, but can contain other components, for example, plasticizers, colorants, IR or UV absorbers, preferably in a proportion of less than 50%.

It is preferable for the at least one thermoplastic intermediate layer, in particular the at least one PVB film, to be a tinted thermoplastic polymer film, in particular a tinted PVB film, with light transmittance from 2% to 80%, preferably from 5% to 50%, and particularly preferably from 8% to 36%. The use of a tinted thermoplastic intermediate layer has the advantage that the light transmittance, based on the entire composite glass pane, can advantageously be adjusted by the selection of the thermoplastic polymer film.

The values for light transmittance (TL) and reflection (RL) refer (as customary for automotive glazing) to the illuminant A, i.e., the visible portion of sunlight at a wavelength from 380 nm to 780 nm. Rays that are substantially within the range of the nonvisible spectrum of solar radiation, in particular infrared rays, are understood to be rays of a wavelength greater than approx. 800 nm.

The individual polymer films, in particular the PVB films, preferably have a thickness of approx. 0.025 mm (25 µm) to 1 mm, in particular of 25 µm to 125 µm, and of 0.3 mm to 1 mm, for example, 50 µm, 100 µm, 0.38 mm, or 0.76 mm. Other properties of the composite glass pane can be influenced via the thickness of the films. For example, thicker PVB films are responsible for improved sound attenuation, in particular, when they contain an acoustically effective core, increased break-in resistance of the composite glass pane, and also increased protection against ultraviolet radiation (UV protection).

In an advantageous embodiment and in particular in an advantageous embodiment of the method according to the invention, the thermoplastic intermediate layer is formed from one or more polyvinyl butyral films. The surface of the polyvinyl butyral film can be embossed and have any desired roughness. Particularly preferred are polyvinyl butyral films with a roughness Rz from 15 µm to 90 µm. Here, Rz is defined as the average peak depth, i.e., the sum of the height of the largest profile peak and the depth of the largest profile valley within a single measurement section Ir.

In another advantageous embodiment and in particular in an advantageous embodiment of the method according to the invention, at least the polyvinyl butyral film that carries the opaque layer is not embossed and has a roughness Rz of at most 50 µm (microns), preferably of at most 10 µm. Such smooth film surfaces can be printed particularly precisely and sharply edged.

In a particularly advantageous embodiment of the invention, the polyvinyl butyral film that carries the opaque layer has a thickness from 0.7 mm to 0.9 mm and a roughness Rz from 25 µm to 50 µm. In an alternative particularly advantageous embodiment of the invention, the polyvinyl butyral film that carries the opaque layer has a thickness from 0.35 mm to 0.55 mm and a roughness Rz from 10 µm to 30 µm. In a particularly advantageous embodiment of the invention, the polyvinyl butyral film that carries the opaque layer has a thickness from 45 µm to 50 µm and a roughness Rz less than or equal to 10 µm, and in particular from 5 µm to 10 µm. In particular, the thinner preferred polyvinyl butyral films are often supplemented by further intermediate layers, with the various films performing different functions. As already mentioned, smoother film surfaces can be printed particularly precisely and sharply edged such that thin films with lower roughness are particularly advantageous for being printed with the opaque layer.

In another advantageous embodiment, the thermoplastic intermediate layer includes at least two individual films, with the opaque layer preferably arranged between the first individual film and the second individual film. In an advantageous further development, the first individual film has a thickness of at most 50 µm; and the second individual film, a thickness of more than 50 µm, with the opaque layer printed on the first individual film. Advantageously, the opaque layer is printed on the surface of the first individual film facing the second individual film. This protects and seals the opaque layer in the interior of the thermoplastic intermediate layer.

The intermediate layer according to the invention (without an opaque layer) can have a constant thickness or a wedge-shaped cross-section and/or can be a stretched thermoplastic intermediate layer.

Furthermore, the thermoplastic intermediate layer can be a functional intermediate layer, in particular an intermediate layer with acoustically damping properties, an intermediate layer tinted at least in some sections, and/or an intermediate layer colored at least in some sections.

An opaque layer is printed at least in some sections on the thermoplastic intermediate layer or on one of the films of the thermoplastic intermediate layer. Such opaque layers, which can be printed on polymer films are well-known to the person skilled in the art, for example, from WO 2019/038043 A1, WO 2002/018154 A1, US 2014212639 A1, U.S. Pat. No. 9,623,634 B2, or WO 2018/122770 A1.

The opaque layer according to the invention is essentially completely nontransparent to visible light. The opaque layer preferably has transmittance TL<1% and in particular TL<0.1%.

The opaque layer according to the invention is preferably black, but can, however, also be any other desired color.

The opaque layer preferably contains color pigments or dyes, particularly preferably inorganic or organic color pigments or dyes, in particular selected from the group consisting of carbon black (also referred to as industrial carbon black), iron oxide pigments, and mixed phase oxide pigments. Mixed phase oxide pigments include, for example, titanate pigments and spinel pigments. The color pigments or dyes are advantageously applied in a water-based or solvent-based composition and preferably dried. The color pigments or dyes can be applied to the thermoplastic intermediate layer by spray methods, screen printing, inkjet methods, or other suitable printing methods. The composition with which the opaque layer is printed contains, in particular, no glass-forming oxides or glass frits or other components that result in a glass-like layer after drying and after lamination.

The opaque layer according to the invention is in particular not glass-like, contains no enamel, is not enamel.

In an advantageous embodiment of the invention, the opaque layer has a thickness of 5 µm (microns) to 40 µm, preferably of 5 µm to 20 µm. Such thicknesses of opaque layers are easy to produce, have sufficient opacity, and can be laminated into a composite pane without further compensating layers or films.

The opaque layer according to the invention can be printed onto any surface of the thermoplastic intermediate layer or onto any surface of individual films of a film composite, in particular even on multiple surfaces.

If the opaque layer is printed onto multiple surfaces, it is then preferably in offset sections. This has the advantage that the total thickness of the intermediate layer with the opaque layer remains lower and is easier to include in laminates.

Alternatively, opposing sections of multiple surfaces can be printed, as a result of which interposed components such as supply lines of electrical functional elements or their edge region or the functional elements themselves can be concealed from both sides.

In an advantageous embodiment of a composite pane according to the invention, the opaque layer covers at least one edge region surrounding the thermoplastic intermediate layer and having width bO. The edge region preferably has a constant width bO and is then also referred to as an edge strip.

In an advantageous embodiment, the edge region of the opaque layer covers edge decoating of the solar protection coating in the through-vision direction through the composite pane, preferably completely. This has the particular advantage that the transition between the solar protection coating and the coating-free region is concealed and also can hardly be detected from the outside of the composite pane.

Advantageously, the width bO of the surrounding edge region is greater than or equal to the width bS of the solar-protection-coating-free edge region; preferably, bO equals from bS to bS+50 mm, and in particular bO is equal to bS.

It goes without saying that the opaque layer, alone or in addition to the edge region, can also be arranged on other sections of the thermoplastic intermediate layer, for example, when the composite pane has at least one sensor window for an optical sensor and the opaque layer is arranged in a region surrounding the sensor window. Alternatively, an opaque layer can conceal supply lines, bus bars, or the edge region of an electrical functional element, preferably a display, a sensor arrangement, a camera, and/or a functional element with electrically controllable optical properties, in particular a PDLC element or an SPD element.

At its edge, the opaque layer can transition completely or in some sections into a gridded region, for example, into a point grid, a perforated grid, or a checkerboard pattern, with a uniform pattern or with increasing or decreasing spacing. In other words, the opaque layer can be printed such that the imprint is, at least in some sections, also semitransparent, for example as a point grid, a strip grid, or a checkered grid. Alternatively, the imprint can also have a gradient, for example, from an opaque covering to a semitransparent covering.

The outer pane and the inner pane are, preferably independent of one another, formed from glass or plastic, preferably soda lime glass, alkali aluminosilicate glass, polycarbonate, or polymethyl methacrylate. In a particularly preferred embodiment, the outer pane and the inner pane are formed from glass.

Suitable glass panes include glass panes known under the trade names Planiclear and Planilux (clear glass in each case), VG10, VG20, VG40, or TSANx, TSA3+, TSA4+ from Saint-Gobain, with the glasses of the VG series being gray-colored glasses and those of the TSA series being green-colored glasses.

The outer and/or the inner pane preferably have, independent of one another, a thickness of 0.1 to 4 mm, preferably of 1 to 4 mm, particularly preferably of 1.6 mm to approx. 2.1 mm. The outer and/or the inner pane can have a constant thickness or even be slightly wedge-shaped.

The composite pane according to the invention preferably has transmittance from 1 to 12%, preferably from 2% to 10% (measured per ISO 9050).

The composite pane according to the invention can also be part of a further glazing, for example, an insulating glazing, security glazing for protection against burglary or damage, or fire protection glazing.

A further aspect of the invention relates to a composite pane, which includes a laminated stacking sequence, composed of at least
    an outer pane having an exterior-side surface I and an interior-side surface II,
    an inner pane having an exterior-side surface III and an interior-side surface IV, and
    at least one thermoplastic intermediate layer that joins the interior-side surface II of the outer pane to the exterior-side surface III of the inner pane,
wherein, prior to lamination
    a solar protection coating is applied directly to the interior-side surface II of the outer pane, which coating substantially reflects or absorbs rays outside the visible spectrum of solar radiation, in particular infrared rays,
    a thermal-radiation-reflecting coating (so-called low-E coating) is applied directly to the interior-side surface IV of the inner pane, and
    the thermoplastic intermediate layer has, in at least one region, a printed opaque layer.

A further aspect of the invention includes a method for producing a composite pane, wherein at least in a first step S1:
    a solar protection coating is arranged on an interior-side surface II of an outer pane, wherein the solar protection coating substantially reflects or absorbs rays outside the visible spectrum of solar radiation, in particular infrared rays, and
    a thermal-radiation-reflecting coating (low-E coating) is arranged on an interior-side surface IV of an inner pane, and
    an opaque layer is printed on to a thermoplastic intermediate layer, at least in some sections.

In a second step S2, at least one stacking sequence composed of an outer pane, a thermoplastic intermediate layer, and an inner pane is created.

In a third step S3, at least the stacking sequence is laminated to form a composite pane.

The solar protection coating and thermal-radiation-reflecting coating are deposited by the methods for deposition of thin layers on the glass panes mentioned at the outset and known to the person skilled in the art.

The lamination of the stacking sequence is carried out by means of common lamination methods. For example, so-called autoclave methods can be carried out at an elevated pressure of approx. 10 bar to 15 bar and temperatures of 130° C. to 145° C. for approx. 2 hours. Vacuum bag or vacuum ring methods known per se operate, for example, at approx. 200 mbar and 80° C. to 110° C. The outer pane, the thermoplastic intermediate layer, and the inner pane can also be pressed in a calender between at least one pair of rollers to form a composite pane. Systems of this type are known for producing panes and normally have at least one heating tunnel upstream upstream from a pressing unit. The temperature during the pressing operation is, for example, from 40° C. to 150° C. Combinations of calender and autoclave methods have proved particularly effective in practice. Alternatively, vacuum laminators can be used. These consist of one or more heatable, evacuable chambers, in which the first pane and the second pane are laminated within, for example, roughly 60 minutes at reduced pressures from 0.01 mbar to 800 mbar and temperatures from 80° C. to 170° C.

In particular, in none of the lamination methods or other subsequent process steps is the stacking sequence heated to more than 170° C., preferably 150°, and particularly preferably 120° C.

In an advantageous embodiment of the method according to the invention, in the first step for producing the opaque layer, a water-based or solvent-based composition containing color pigments or dyes is applied to the thermoplastic intermediate layer. Spray methods, screen printing methods, inkjet methods, or other suitable printing methods are in particular suited for this. Preferably, the composition is dried following the application.

A further aspect of the invention includes a composite pane according to the invention that is produced by the method according to the invention.

Consequently, the invention includes a composite pane obtainable by a method wherein, at least in a first step S1:
a solar protection coating is arranged on an interior-side surface II of an outer pane, wherein the solar protection coating substantially reflects or absorbs rays outside the visible spectrum of solar radiation, in particular infrared rays, and
a thermal-radiation-reflecting coating is arranged on an interior-side surface IV of an inner pane, and
an opaque layer is printed onto a thermoplastic intermediate layer at least in some sections;

in a second step S2:
a stacking sequence composed of the outer pane, the thermoplastic intermediate layer, and the inner pane is created; and in a third step S3:
the stacking sequence is laminated to form a composite pane.

It should again be emphasized that in the composite pane according to the invention, the opaque layer is made of different materials and has a different microstructure than in a conventional prior art masking print that is printed on a surface of the glass panes (for example, by screen printing) and is baked in a process step at high temperatures (for example, during the bending of the glass pane). Such masking prints consist of a ceramic ink and contain glass-forming oxides or glass frits that form a glass-like coating on the glass pane after baking. This glass-like coating has a firm and intimate bond to the surface of the glass pane. In the case of disassembly of the composite pane using high forces, such a masking print cannot be detached from the glass surface.

In a composite pane produced according to the invention, the opaque layer is firmly bonded to the thermoplastic intermediate layer before and/or during lamination. The temperatures are not sufficient to result in a firm bond to a possibly adjacent glass pane. Consequently, when the composite pane is disassembled, the opaque layer together with the intermediate layer can be detached from the glass panes.

The present invention relates, in addition, to the use of the composite pane according to the invention in a vehicle on water, on land, or in the air, preferably as a roof panel of a vehicle, particularly preferably as a roof panel of a motor vehicle, in particular of a passenger car. Alternatively, the composite pane according to the invention can also be used in a building glazing or in other architectural glazing.

The present invention further relates to a vehicle, preferably a motor vehicle, including the composite glass pane according to the invention.

In the following, the invention is explained in detail with reference to drawings and exemplary embodiments. The drawings are a schematic representation and are not to scale. The drawings in no way restrict the invention.

They depict.

Figure 1A:
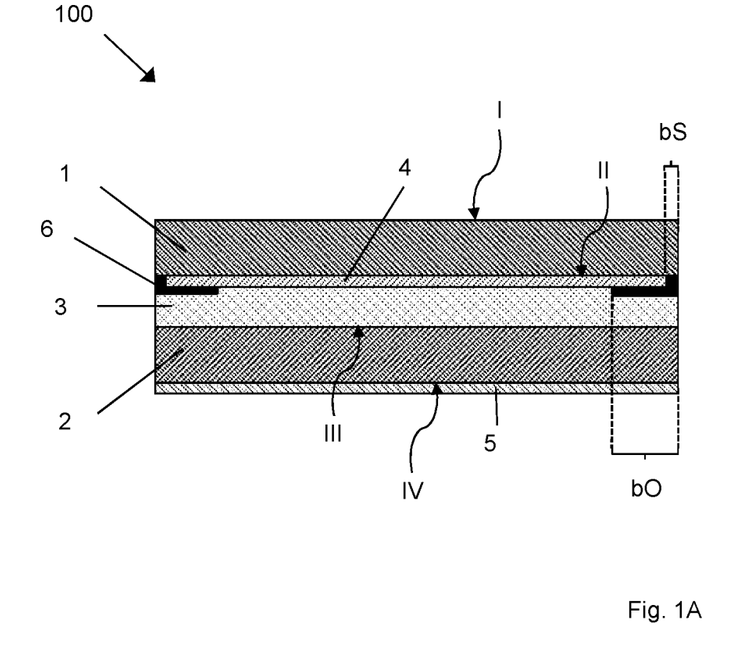
FIG. 1A a cross-section through an embodiment of a composite pane according to the invention, FIG. 1B a schematic cross-section through the composite pane according to the invention prior to lamination, FIG. 2 a schematic representation of the method according to the invention, FIG. 3 a cross-section through an embodiment of another composite pane according to the invention, and FIG. 4 a cross-section through an embodiment of another composite pane according to the invention.

FIG. 1A depicts a cross-section through an embodiment of a composite pane 100 according to the invention. The composite pane 100 comprises an outer pane 1 and an inner pane 2 that are laminated to one another via a thermoplastic intermediate layer 3 and are thus permanently joined.

Figure 1B:
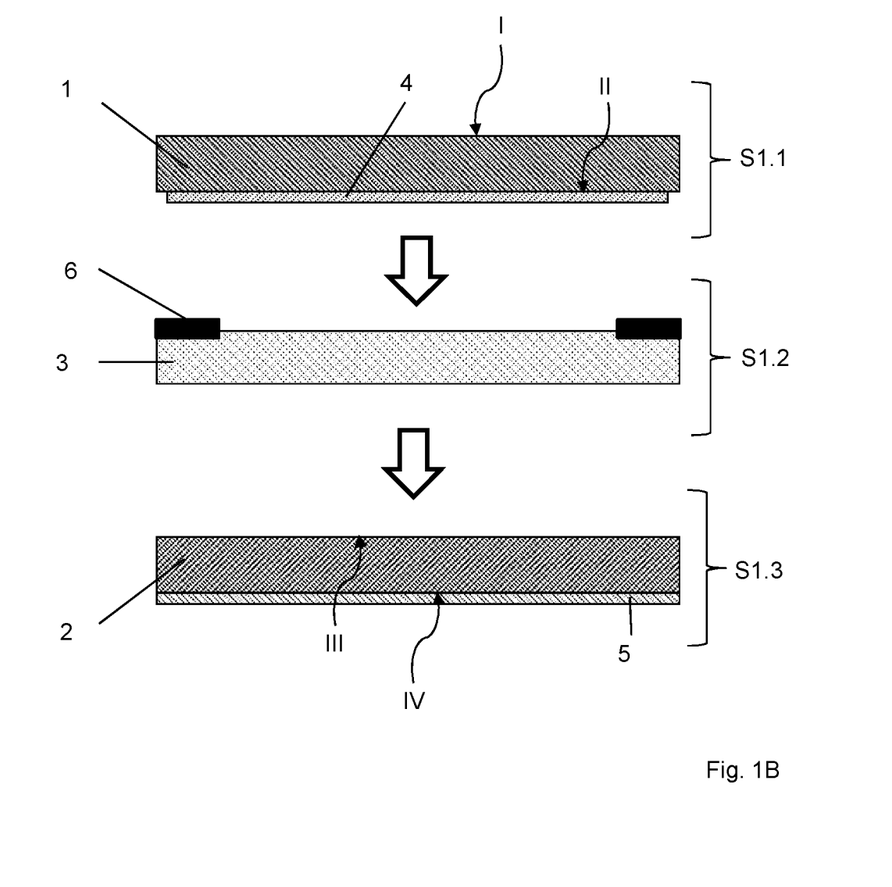

FIG. 1B depicts an exploded drawing in the form of a cross-section through the individual elements of the composite pane 100. At the same time, FIG. 1B reproduces the essential features of the method for producing the composite pane 100, as is further explained with regard to FIG. 2.

The composite pane 100 has a size of approx. 2 m$^2$ and is provided, for example, as a roof panel of a passenger car, with the outer pane 1 intended to face the external surroundings and the inner pane 2 intended to face the vehicle interior. The outer pane 1 has an exterior-side surface I and an interior-side surface II. The inner pane 2 has an exterior-side surface III and an interior-side surface IV. The exterior-side surfaces I and III face the external surroundings in the installed position; the interior-side surfaces II and IV face the vehicle interior in the installed position. The interior-side surface II of the outer pane 1 and the exterior-side surface III of the inner pane 2 face one another. The outer pane 1 and the inner pane 2 contain, for example, soda lime glass and have, for example, a thickness of 2.1 mm in each case. The thermoplastic intermediate layer 3 contains or consists of polyvinyl butyral (PVB) and has, for example, a thickness of 0.76 mm. It goes without saying that composite panes 100 according to the invention can also have different dimensions adapted to the respective individual case and, in particular, different layer thicknesses for the outer pane 1, the inner pane 2, and the thermoplastic intermediate layer 3.

A solar protection coating 4 is arranged on the interior-side surface II of the outer pane 1. The solar protection coating 4 extends, for example, over the entire surface II minus a perimetral frame-shaped coating-free region with a width bS of, for example, 8 mm. The coating-free region is hermetically sealed by adhesive bonding with the thermoplastic intermediate layer 3. The solar protection coating 4 is thus advantageously protected against damage and corrosion, emanating, in particular, from the edge of the composite pane 100. The solar protection coating 4 comprises, for example, at least two functional layers, which at least contain silver or are made of silver and have, by way of example, a layer thickness of 5 nm to 25 nm or of 8 nm to 20 nm, with each functional layer arranged between two dielectric layers of silicon nitride with a thickness of 40 nm to 70 nm.

A thermal-radiation-reflecting coating 5 is arranged on the interior-side surface IV of the inner pane 2. The coating 5 includes a functional ITO layer with a thickness of 60 nm to 150 nm. The coating 5 also includes further dielectric layers, made in particular of Al-doped $SiO_2$ and $Si_3N_4$, above and below the functional layer.

The solar protection coating 4 results in reduced heating of the vehicle interior and of the inner pane 2 due to reflection of infrared radiation. On the one hand, the thermal-radiation-reflecting coating 5 reduces the radiation of thermal radiation through the composite pane into the vehicle interior, in particular at high outside temperatures. On the other hand, the thermal-radiation-reflecting coating 5 reduces the radiation of thermal radiation out of the vehicle interior at low outside temperatures.

Furthermore, in the edge region of the thermoplastic intermediate layer 3, an opaque layer 6 is arranged on the thermoplastic intermediate layer 3 and is, for example, printed over the entire surface in the edge region. Here, the opaque layer 6 is, for example, black and has, for example, a thickness of 12 µm. The opaque layer 6 covers an edge region with a width bO of, for example, 25 mm. As a result, the opaque layer 6 covers the coating-free edge region of the solar protection coating 4, when viewed through the laminated composite pane 100 from the inside out. At the same time, the opaque layer 6 covers any adhesive bead or sections of a frame, such as the body of a vehicle, when the composite pane 100 is arranged in a vehicle or in a building glazing. Due to the arrangement of the opaque layer 6 below the solar protection coating-free edge region, although the region is visible when looking at the outer pane 1, it can hardly be detected because of the black background of the opaque layer 6.

It goes without saying that further opaque layer regions (not shown here) can be arranged on the thermoplastic intermediate layer 3 and thus, for example, conceal the border of a coating-free sensor window. Alternatively, the opaque layer 6 can conceal supply lines, connections, or transitions of functional elements within the composite pane 100 and, in particular, within the thermoplastic intermediate layer 3. The functional element can, for example, be a PDLC film that is arranged between two individual plies of the thermoplastic intermediate layer 3.

It goes without saying that such an opaque layer 6 can also be arranged on the surface of the thermoplastic intermediate layer 3 facing the inner pane 2, and/or arranged between two individual films 3.1, 3.2 of a thermoplastic intermediate layer 3.

Figure 2:
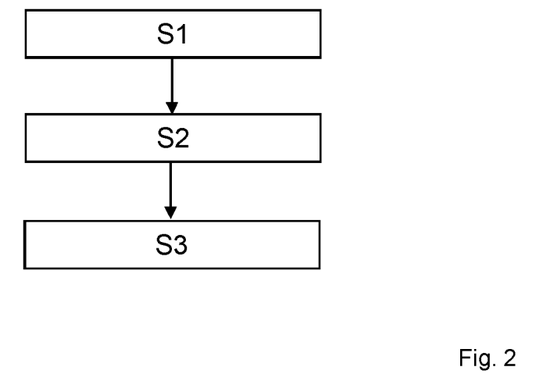

FIG. 2 is a schematic representation an exemplary embodiment of the method according to the invention.

In a first step S1:
a solar protection coating 4 is arranged on an interior-side surface II of an outer pane 1, with the solar protection coating 4 substantially reflecting or absorbing rays outside the visible spectrum of solar radiation, in particular infrared rays, (The unit referenced with S1.1 in FIG. 1B is created.);
an opaque layer 6 is printed on a thermoplastic intermediate layer 3 at least in some sections (The unit referenced with S1.2 in FIG. 1B is created.), and
a thermal-radiation-reflecting coating 5 is arranged on an interior-side surface IV of an inner pane 2 (The unit referenced with S1.3 in FIG. 1B is created.).

It goes without saying that the substeps that result in the units S1.1, S1.2, and S1.3 can be carried out in any order or simultaneously.

Furthermore, in a second step S2, a stacking sequence composed of the outer pane 1 (with the solar protection coating 4), the thermoplastic intermediate layer 3 (with the printed opaque layer 6), and the inner pane 2 (with the thermal-radiation-reflecting coating 5) is created. In this process, the solar protection coating 4 on the interior-side surface II of the outer pane 1 comes into direct contact with the imprinted surface of the thermoplastic intermediate layer 3 and the unprinted side of the thermoplastic intermediate layer 3 comes into direct contact with the exterior-side surface III of the inner pane 2, i.e., with the side of the inner pane 2 facing away from the thermal-radiation-reflecting coating 5. The units S1.1, S1.2, and S1.3 are, consequently, joined together, for example, in the stacking sequence shown in FIG. 1B.

Furthermore, in a third step S3, the stacking sequence is laminated to form a composite pane 100.

Figure 3:
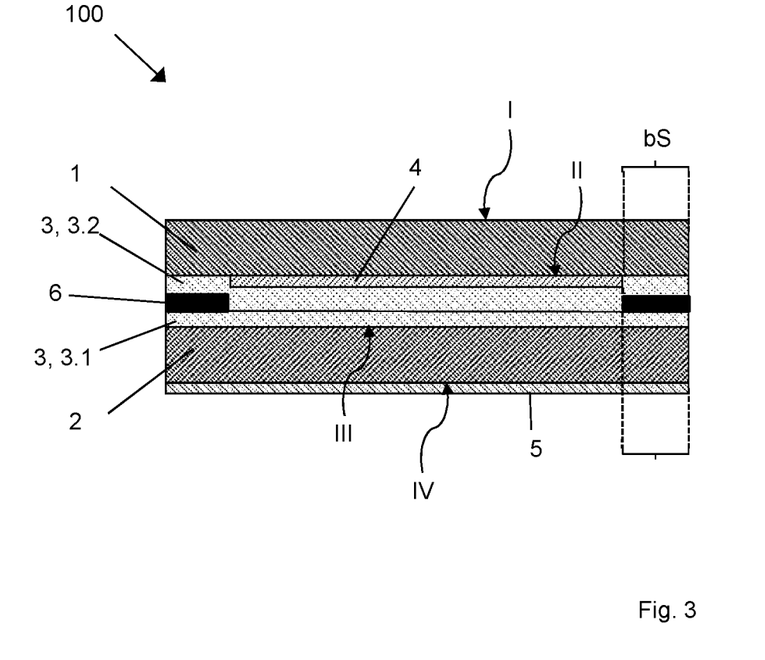

FIG. 3 depicts a cross-section through an alternative embodiment of a composite pane 100 according to the invention. The structure of the composite pane 100 and in particular the outer pane 1 with the solar protection coating 4, the inner pane 2 with the thermal-radiation-reflecting coating 5, and the thermoplastic intermediate layer 3 with the opaque layer 6 substantially correspond to the structure from FIG. 1A such that only the differences will be discussed in the following.

In the example shown, the thermoplastic intermediate layer 3 consists, for example, of two individual films 3.1, 3.2 made of PVB. The individual film 3.1 has a thickness of, for example, 50 µm; the individual film 3.2, a thickness of, for example, 0.76 mm. The opaque layer 6 was printed onto a surface of the individual film 3.1. Subsequently, the individual film 3.2 was arranged on the imprinted side of the individual film 3.1 such that the opaque layer 6 is firmly situated in the interior of the thermoplastic intermediate layer 3. After lamination, the opaque layer 6 is firmly embedded in the thermoplastic intermediate layer 3.

Furthermore, the width bS of the coating-free edge region of the solar protection coating 4 corresponds to the width bO of the imprinted edge region of the opaque layer 6 and is, for example, 10 mm. As a result, the transition between the solar protection coating 4 and the coating-free edge region is particularly well concealed and visually inconspicuous.

It goes without saying that such an opaque layer 6 can also be arranged on the surface of the thermoplastic intermediate layer 3 facing the outer pane 1, and/or the surface of the thermoplastic intermediate layer 3 facing the inner pane 2.

Figure 4:
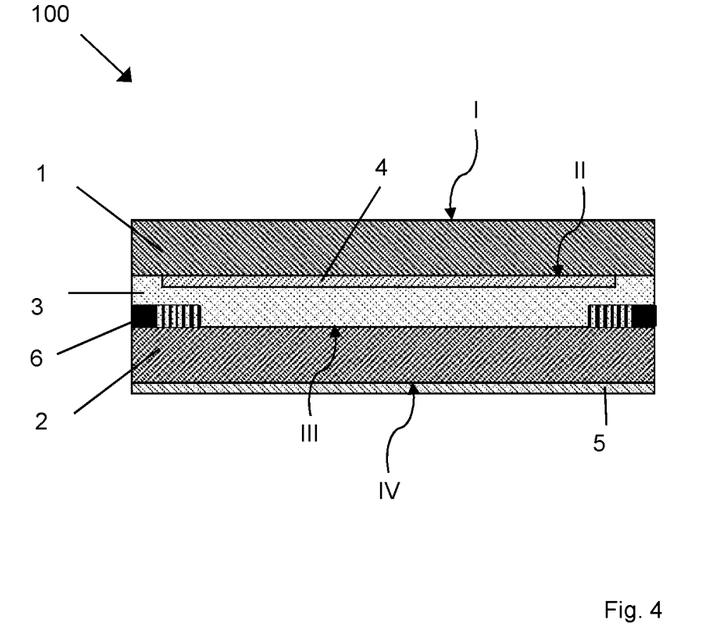

FIG. 4 depicts a cross-section through another alternative embodiment of a composite pane 100 according to the invention. The structure of the composite pane 100 and in particular the outer pane 1 with the solar protection coating 4, the inner pane 2 with the low-E coating 5, and the thermoplastic intermediate layer 3 with the opaque layer 6 substantially correspond to the structure from FIG. 1A such that only the differences will be discussed in the following.

In this example, the opaque layer 6 was arranged on the side facing the exterior-side surface III of the inner pane 2. Furthermore, the opaque layer 6 consists of a completely imprinted layer region, beginning at the outermost edge of thermoplastic intermediate layer 3, and transitioning inward into a discontinuous region of the opaque layer 6. In the discontinuous region, the opaque layer 6 has, for example, a point grid. The discontinuous region with the point grid is arranged, when viewed through the composite pane 100, congruent with the transition between the solar protection coating 4 and the solar protection coating-free edge region. As investigations by the inventors showed, the transition between the solar protection coating 4 and the coating-free edge can hardly be seen optically, thus creating a very aesthetic impression.

It goes without saying that such an opaque layer 6 can also be arranged on the surface of the thermoplastic intermediate layer 3 facing the outer pane 1, and/or between two individual films 3.1, 3.2 of the thermoplastic intermediate layer 3.

The composite pane according to the invention and the method according to the invention have significant advantages compared to a masking print according to the prior art that is applied directly on a glass surface since, there, it is baked at relatively high temperatures and the masking print forms a glass-like coating or an enamel.

As described at the outset, this form of application of the masking print on a glass pane is difficult or impossible with surface-coated glasses. In addition to adhesion problems in the composite pane, undesirable discolorations or defects in the masking print or in the coatings can develop. This is true in particular for a masking print according to the prior art that is applied and baked on a solar-protection coating and in particular a silver-based solar-protection coating.

Alternatively, it would be possible to arrange and bake a masking print according to the prior art, for example, on the the exterior-side surface III of an inner pane 2 when the thermal-radiation-reflecting coating 5 is situated on the interior-side surface IV of the inner pane 2. However, this has the disadvantage that during production, both sides of the inner pane 2 have to be processed, i.e., the pane has to be handled and/or rotated in a complicated manner. In other words, this entails increased effort and thus increased costs.

All these disadvantages that arise with a prior art masking print are successfully solved and avoided by the decoupling according to the invention of the opaque layer 6 from the outer pane 1 (with the solar-protection coating 4) and from the inner pane 2 with the thermal-radiation-reflecting coating 5.

LIST OF REFERENCE CHARACTERS

1 outer pane
2 inner pane
3 thermoplastic intermediate layer
3.1,3.2 individual film
4 solar protection coating
5 thermal-radiation-reflecting coating/low-E coating
6 opaque layer/masking print
bS width of the coating-free edge region of the solar protection coating 4
bO width of the edge region imprinted with the opaque layer 6
Rz roughness
S1.1, S1.2, S1.3 unit
S1, S2, S3 process step
I exterior-side surface (outer surface) of the outer pane 1
II interior-side surface (inner surface) of the outer pane 1
III exterior-side surface (outer surface) of the inner pane 2
IV interior-side surface (inner surface) of the inner pane 2

The invention claimed is:

1. A composite pane, comprising a laminated stacking sequence composed of
an outer pane having an exterior-side surface and an interior-side surface,
an inner pane having an exterior-side surface and an interior-side surface, and
at least one thermoplastic intermediate layer that joins the interior-side surface of
the outer pane to the exterior-side surface of the inner pane,
wherein
a solar protection coating is applied directly to the interior-side surface of the outer pane, which solar protection coating reflects or absorbs rays outside the visible spectrum of solar radiation,
a thermal-radiation-reflecting coating is applied directly to the interior-side surface of the inner pane,
the thermoplastic intermediate layer has, in at least one region, an opaque layer that is devoid of glass-forming oxide or glass frit, and
at least a portion of the opaque layer is provided in contact with the solar protection coating such that the solar protection coating is arranged between the interior-side surface of the outer pane and said portion of the opaque layer.

2. The composite pane according to claim 1, wherein the solar protection coating comprises a layer system with at least one metal layer embedded between dielectric oxide layers or nitride layers.

3. The composite pane according to claim 2, wherein the at least one metal layer is a metallic silver layer.

4. The composite pane according to claim 1, wherein the thermal-radiation-reflecting coating contains a transparent conductive oxide.

5. The composite pane according to claim 4, wherein the transparent conductive oxide contains indium tin oxide, tin oxide doped with antimony or fluorine, and/or aluminum-doped zinc oxide (ZnO:Al) and/or gallium-doped zinc oxide (ZnO:Ga).

6. The composite pane according to claim 1, wherein the thermoplastic intermediate layer is formed from at least one polymer film, which contains polyvinyl butyral, ethylene vinyl acetate, polyurethane, and/or mixtures thereof and/or copolymers thereof.

7. The composite pane according to claim 1, wherein the thermoplastic intermediate layer is implemented as a multilayer film composite, at least comprising a first individual film with a thickness of at most 50 μm and a second individual film with a thickness of more than 50 μm.

8. The composite pane according to claim 1, wherein the thermoplastic intermediate layer is a polyvinyl butyral film and has surface roughness Rz of a maximum of 50 μm.

9. The composite pane according to claim 1, wherein the outer pane and/or the inner pane are formed from glass and/or polymers, and the outer pane and/or the inner pane have a thickness of 0.5 mm to 4 mm.

10. The composite pane according to claim 1, wherein the opaque layer contains color pigments or dyes selected from the group consisting of carbon black, iron oxide pigments, and mixed phase oxide pigments.

11. The composite pane according to claim 1, wherein the opaque layer has a thickness of 5 μm to 40 μm.

12. The composite pane according to claim 1, wherein the opaque layer is arranged in an edge region surrounding the composite pane.

13. The composite pane according to claim 12, wherein an edge of the solar protection coating is recessed relative to an edge of the outer pane such that a coating-free edge region is present between the edge of the solar protection coating and the edge of the outer pane, and wherein a width of the edge region of the opaque layer is greater than or equal to a width of the coating-free edge region, and/or the edge region of the opaque layer completely covers the coating-free edge region in a through-vision direction through the composite pane.

14. The composite pane according to claim 1, wherein the thermoplastic intermediate layer contains or consists of at least two individual films, and an electrical functional element is embedded between the individual films.

15. The composite pane according to claim 1, wherein the composite pane has at least one sensor window for an optical sensor, and the opaque layer is arranged in a region surrounding the sensor window.

16. The composite pane according to claim 1, wherein the solar protection coating reflects or absorbs infrared rays.

17. The composite pane according to claim 1, wherein the opaque layer is printed on the thermoplastic intermediate layer.

18. A method comprising providing the composite pane according to claim 1 as glazing of a vehicle on water, on land, or in the air.

19. A method for producing a composite pane, comprising:
- in a first step:
    - a solar protection coating is arranged on an interior-side surface of an outer pane, wherein the solar protection coating reflects or absorbs rays outside the visible spectrum of solar radiation, and
    - a thermal-radiation-reflecting coating is arranged on an interior-side surface of an inner pane, and
    - an opaque layer is printed on a thermoplastic intermediate layer, at least in some sections, the opaque layer being devoid of glass-forming oxide or glass frit;
- in a second step:
    - a stacking sequence composed of the outer pane, the thermoplastic intermediate layer, and the inner pane is created; and
- in a third step:
    - the stacking sequence is laminated to form a composite pane,
    - wherein at least a portion of the opaque layer is provided in contact with the solar protection coating such that the solar protection coating is arranged between the interior-side surface of the outer pane and said portion of the opaque layer.

20. The method according to claim 19, wherein the first step includes at least providing a thermoplastic intermediate layer, applying a composition containing water-based or solvent-based color pigments or dyes to the thermoplastic intermediate layer in at least one region, and drying the applied composition.

* * * * *